Figure 1:
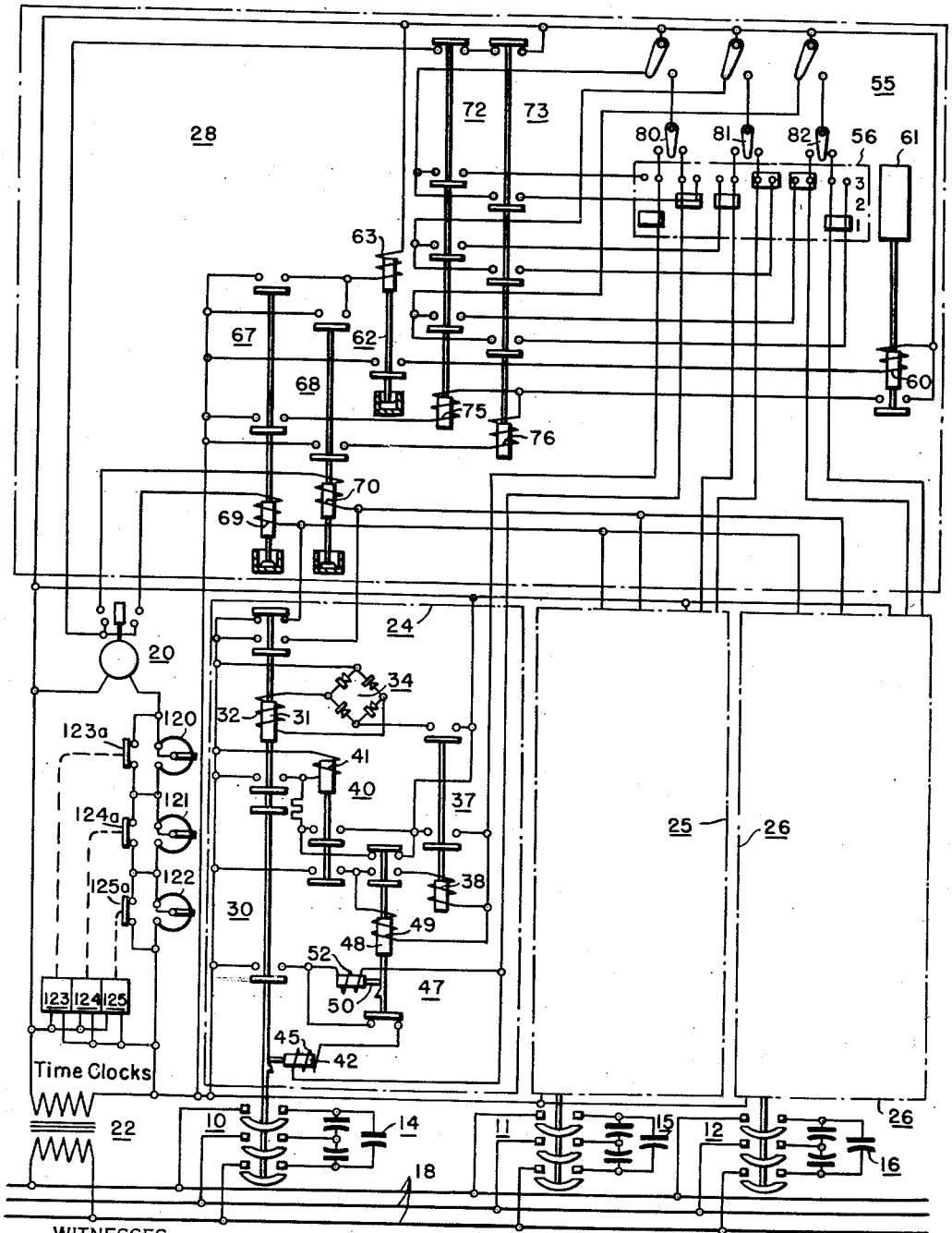

Sept. 21, 1954  W. H. CUTTINO  2,689,937
AUTOMATIC SWITCHING SYSTEM
Filed Sept. 29, 1949  2 Sheets-Sheet 1

WITNESSES:
E. A. McCloskey
F. V. Giolma

INVENTOR
William H. Cuttino.
BY
G. J. Crawford
ATTORNEY

Patented Sept. 21, 1954

2,689,937

UNITED STATES PATENT OFFICE 2,689,937

AUTOMATIC SWITCHING SYSTEM

William H. Cuttino, Wilkinsburg, Pa., assignor to Westinghouse Electric Corporation, East Pittsburgh, Pa., a corporation of Pennsylvania Application September 29, 1949, Serial No. 118,687

9 Claims. (Cl. 323—66)

My invention relates generally to automatic switching systems, and it has reference in particular to automatic switching systems such as may be utilized for controlling the connections of capacitors and the like to power circuits.

Generally stated, it is an object of my invention to provide an automatic switching system for capacitors and the like which is simple and inexpensive to manufacture, and which is reliable and effective in operation.

More specifically, it is an object of my invention to provide, in an automatic switching system for capacitors and the like, for changing the calibration of a voltage control relay in accordance with circuit conditions of an associated power circuit.

Another object of my invention is to provide, in an automatic switching system of the character described, for automatically varying the sensitivity of a voltage responsive control relay in accordance with circuit conditions of a power circuit.

Yet another object of my invention is to provide, in a switching system of the character described, for automatically varying the operating band width setting of a voltage relay controlling the connection of capacitors to a power circuit in accordance with the number of feeder circuits connecting the power circuit to a source of electrical energy.

It is also an important object of my invention to provide, in a switching system for capacitors and the like, for utilizing an electromagnet to vary the sensitivity of a voltage relay controlling the connection of capacitors to a power circuit and for varying the energization of the electromagnet in accordance with the number of feeder breakers connecting the power circuit to a source.

It is also an important object of my invention to provide, in an automatic switching system for capacitors, for lowering and raising the voltage level of a voltage relay controlling switching of the capacitors in accordance with a predetermined pattern of increase and decrease in the load of an electrical system.

A further object of my invention is to provide, in an automatic switching system for capacitors, for progressively increasing and decreasing the resistance in series circuit relation with a voltage relay controlling the connection of the capacitors to a power circuit by means of time switches which operate in accordance with a predetermined load pattern of the power circuit.

Other objects will in part be obvious, and will in part be explained hereinafter.

In practicing my invention in one of its forms, a plurality of capacitors are disposed to be connected to and disconnected from a power circuit in response to operation of a voltage relay connected to be energized from the power circuit. An electromagnet is positioned adjacent the armature of the relay to restrain movement thereof from an intermediate operating position. The sensitivity or band width setting of the voltage relay is adjusted in accordance with the reactance of the circuit by energizing the electromagnet through a control circuit having a plurality of impedance devices which are shunted by normally closed contact members of a plurality of circuit breakers by which the power circuit is connected to its source through feeders. As the several feeder breakers are closed, impedances associated therewith are connected in circuit relation with the electromagnet so as to reduce the band width setting and increase the sensitivity of the voltage relay.

Figure 2:
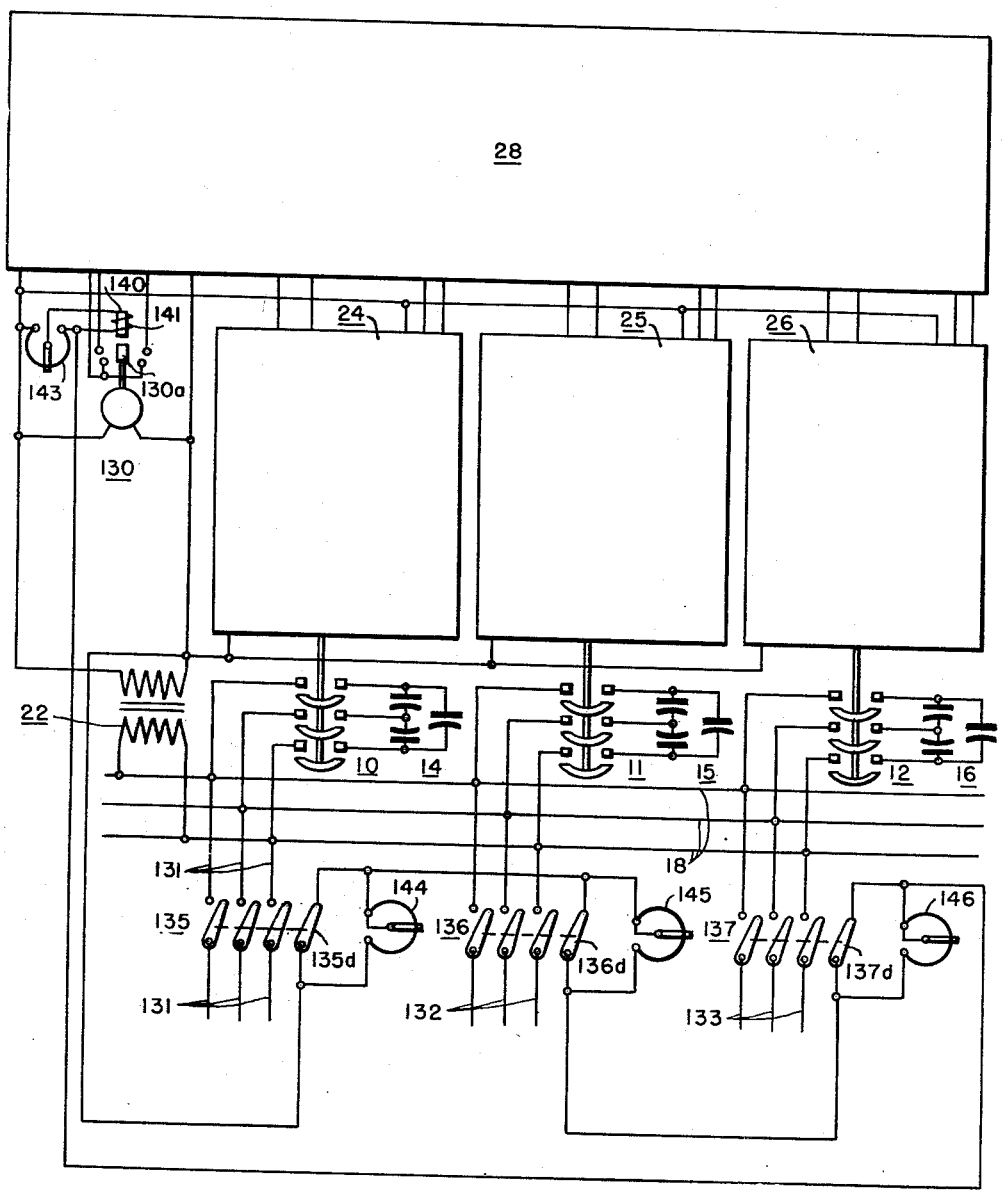

For a more complete understanding of the nature and scope of my invention, reference may be made to the following detailed description, which may be read in connection with the accompanying drawings, in which:

Figure 1 is a diagrammatic view of a switching system embodying the invention in one of its forms; and Fig. 2 is a diagrammatic view of a switching system embodying the invention in another of its forms.

The invention in both instances has been illustrated as applied to a capacitor switching system, such as disclosed in my copending application, Serial No. 61,042, which was filed on November 19, 1948, now Patent No. 2,534,902. Numbers used herein to refer to apparatus described in the copending application are identical with the numbers used in said application, and additional apparatus is designated by numbers not appearing in said copending application.

Referring particularly to Fig. 1, it will be seen that a plurality of circuit breakers 10, 11 and 12 may be provided for connecting banks of capacitors 14, 15 and 16, respectively, to the conductors 18 of an electrical power circuit under the control of a voltage relay 20 which may be energized from the conductors 18 through a voltage transformer 22. Individual control equipment for the circuit breakers 10, 11 and 12 is contained within enclosures 24, 25 and 26, respectively. Common control means for effecting operation of the several circuit breakers under the control of the voltage relay 20 is contained within an enclosure 28.

The circuit breakers 10, 11 and 12 may be of any suitable type, and the breaker 10 may, for example, comprise an operating mechanism 30 provided with an armature 31 having an operating winding 32. The operating winding may be energized from the control transformer 22 through a bridge circuit 34 of rectifier devices by means of a closing relay 37 having an operating winding 38.

A cutoff relay 40 having an operating winding 41 may be provided for deenergizing the operating winding 38 in response to closing of the circuit breaker. The breaker may be maintained in the closed position by latch means comprising a movable armature 42 having a trip winding 45 for releasing the armature to the trip position. Automatic control of the closing relay and latch means may be provided by means of a lockout relay 47 comprising an armature 48 having an operating winding 49 and a latch device 50 disposed to hold the armature 48 in the operated position. A reset winding 52 may be utilized to actuate the latch device and release the armature 48.

A sequence relay 55 may be provided for sequentially setting up a closing circuit for one circuit breaker and a trip circuit for another circuit breaker in different combinations for each of its operating positions as explained in detail in my copending application hereinbefore referred to. For example, the relay 55 may comprise a drum 56 disposed to be actuated by means of a ratchet mechanism or the like 61 having an operating winding 60.

A time delay relay 62 having an operating winding 63 may be provided for effecting operation of the sequence relay 55. Additional time delay relays 67 and 68 having operating windings 69 and 70, respectively, may be provided for effecting operation of the time delay relay 62 in response to operation of the voltage relay 20 to its different operating positions, depending upon whether the voltage of the conductors 18 falls or rises.

Auxiliary control relays 72 and 73 having operating windings 75 and 76 may be utilized to complete either a closing or a tripping circuit for different ones of the circuit breakers under the control of the relays 67 and 68 and the sequence relay 55. Manual operation of the breakers may be effected by operating manual switches 80, 81 and 82, respectively.

In order to provide for lowering the voltage level of the voltage relay 20 relative to the conductors 18 to recalibrate the voltage relay under different load conditions, a plurality of rheostats 120, 121 and 122 may be connected in series circuit relation with the voltage relay 20 and the secondary winding of the control transformer 22 for reducing the voltage applied to the relay 20 from the control transformer.

Since the general load pattern of a particular power system is usually fairly well established, the voltage level of the relay 20 may be controlled by means of time clocks 123, 124 and 125 having contact members 123a, 124a and 125a which may be actuated to vary the effective value of resistance in circuit with the relay 20 in accordance with the general load conditions of the power system. The voltage level of the voltage relay 20 may thus be lowered in response to one or more increases in load by the insertion of resistance and increased in response to successive decreases of the load pattern by shunting out resistance, progressively.

In operation the equipment will function generally in the manner described in my copending application to sequentially utilize the several banks of capacitors 13, 14 and 15, for either adding them to the line one after the other cumulatively as the voltage continues to fall or connecting them one at a time in sequence, as the voltage falls and then rises again at different intervals of time. During periods of normal load the time clocks will maintain shunts around the rheostats 120, 121 and 122 so as to effect a substantially normal relation between the operating level of the voltage relay 20 and the voltage of the conductors 18.

At the time when the load pattern has a characteristic increase, the time clock 123 will operate to open contact member 123a and insert the rheostat 120 in series circuit relation with the voltage relay 20 and the control transformer 22. The resultant reduction in voltage applied to the voltage relay 20 may be sufficient either to directly effect operation of the voltage relay or effect subsequent operation thereof in response to less than the usual amount of voltage drop, to effect connection of one of the capacitor banks 14, 15 and 16 to the conductors 18, as determined by the sequence relay 55.

The time clock 124 will likewise operate to open contact member 124a in accordance with the characteristic load pattern when a further increase in load may be expected so as to effect connection of another one of the capacitor banks to the conductors 18. Operation of the time clock 125 may in a like manner effect connection of the third of the capacitor banks to the conductors 18.

At the predetermined time when the load pattern shows a decrease, the time clock 125 will operate to close contact member 125a, to shunt rheostat 120 and increase the voltage level of the relay 20 so as to either directly effect disconnection of one of the capacitor banks from the conductors 18 or effect disconnection thereof upon a subsequent rise of line voltage less than would be required to effect disconnection with the rheostat 120 effective, under the control of the sequence relay 55. The time clocks 124 and 125 likewise operate in accordance with the characteristic load pattern of the system to disconnect the other capacitor banks at the times when the load pattern shows a predetermined drop, in sequence as determined by the sequence relay 55, in the manner described in my copending application, Serial No. 61,042 now Patent No. 2,534,902.

By utilizing time clocks which operate in accordance with the characteristic load pattern of the system to change the resistance in the operating circuit of the voltage responsive control relay, switching of the capacitors may readily be effected in accordance with load conditions when they are necessary to furnish the desired kilovars, despite the fact that other regulating equipment on the system may operate to maintain the voltage of the system within such close limits as would not normally result in connection of the capacitors when the connection is determined by the voltage of the system alone.

Referring to Fig. 2, it may be seen that the circuit breakers 10, 11 and 12 may likewise be utilized to control the connections of banks of capacitors 14, 15 and 16 under the control of a voltage relay 130 which corresponds to the voltage relay 20 of Fig. 1. The individual control equipment for the circuit breakers 10, 11 and 12 is represented by the enclosures 24, 25 and 26 which contain equipment identical with that described in connection with the enclosure 24 of Fig. 1. The common control equipment for the circuit breakers designated by the enclosure 28 is identical with that shown and described in connection with Fig. 1.

In this particular instance the conductors 18 may be supplied with electrical energy from a suitable source through a plurality of feeders represented by the conductors 131, 132 and 133 which may be connected to the conductors 18 through feeder circuit breakers or the like, which may be represented by the several switch means 135, 136 and 137, respectively.

Since the reactance of the source with respect to the conductors 18 will vary, depending on whether one or more of the feeders is used to supply electrical energy to the conductors 18, it has been found desirable to provide for automatically varying the band width setting for the sensitivity of the voltage relay 130, so as to have a relatively small band width setting or high sensitivity and have the relay respond to relatively small changes of circuit voltage when all the feeder circuits are closed, and to have a relatively wide band width setting or low sensitivity requiring a relatively large change of circuit voltage to effect operation of the voltage relay, so as to reduce hunting, when the reactance back to the source is increased by one or more of the feeder circuit breakers opening.

In order to accomplish this result, an electromagnet 140 having operating winding 141 may be provided for exerting restraining force on the armature 130a of the voltage relay 130 by magnetically biasing it to its normal or intermediate position as shown. The sensitivity or band width setting of the voltage relay may be varied by applying a variable voltage to the winding 141 of the electromagnet so as to provide a stronger or a weaker restraining force tending to hold the armature 130a in its intermediate position. The winding 141 may, for example, be connected to the control transformer 22 through a potentiometer 143.

Rheostats 144, 145 and 146 may be provided in connection with the winding 141 and the potentiometer. Contact members 135d, 136d and 137d may be provided in connection with the switch devices 135, 136 and 137 for shunting the rheostats 144, 145 and 146, respectively, when the switch devices are in their open positions, thereby increasing the energization of the operating winding 141 and decreasing the sensitivity of the voltage relay when the switch devices or feeder breakers are open.

In the operation of the system, the control equipment 24, 25, 26 and 28 will operate in the manner explained in connection with Fig. 1 and in my copending application hereinbefore referred to for sequentially effecting operation of the circuit breakers 10, 11 and 12 to connect the banks of capacitors 14, 15 and 16 to, and disconnect them from the conductors 18 in accordance with variations in the voltage of the conductors 18.

With all of the switch devices 135, 136 and 137 in the closed position, the rheostats 144, 145 and 146 will be connected in series circuit relation with the operating winding 141 of the electromagnet 140 across the potentiometer 143. Accordingly, the energization of the operating winding 141 of the electromagnet 140 will be reduced to a minimum, thus reducing the band width setting and providing the maximum sensitivity of the voltage relay.

Should, for example, the switch device 135 be opened, thus increasing the reactance of the source relative to the conductors 18, the rheostat 144 will be shunted by contact member 135d. Accordingly, the m.m.f. of the electromagnet 140 will be increased, thus reducing the sensitivity of the voltage relay and reducing the possibility of hunting in response to voltage fluctuations of the conductors 18.

Should the switch device 136 be opened, thus further increasing the reactance of the source, the rheostat 145 will be shunted, and the sensitivity of the voltage relay 130 will be further reduced. The positions of each of the rheostats 144, 145 and 146 may be adjusted in accordance with the reactance of its feeder circuit so as to compensate more nearly exactly for the change in reactance produced by the opening of the associated feeder switch device.

From the above description and accompanying drawings, it will be apparent that I have provided, in a simple and effective manner, for changing the operating characteristics of the control relay in a capacitor switching system in accordance with predetermined characteristics of the load circuit. By utilizing time clocks to vary the voltage level of the control relay relative to the power system, effective switching of the capacitors may be provided regardless of the regulating effects of other regulating equipment such as induction regulators which may be connected to the system. By varying the sensitivity of the control relay in accordance with the number of feeders connecting the power circuit to the source, reliable and efficient operation of the switching system may be obtained.

Since certain changes may be made in the above-described construction, and different embodiments of the invention may be made without departing from the spirit and scope thereof, it is intended that all the matter contained in the above description and shown in the accompanying drawings shall be considered as illustrative and not in a limiting sense.

I claim as my invention:

1. In a switching system for a plurality of capacitors, a single relay means disposed to effect connection of said capacitors to and disconnection thereof from an electric circuit in accordance with predetermined voltage conditions of said circuit, and circuit means including a plurality of impedance devices and associated switch means connected to progressively vary the voltage applied to the relay means in accordance with circuit conditions of the electric circuit.

2. The combination in a switching system for a plurality of capacitors each having a switch device operable to connect it to an electric power circuit, of control means including a voltage relay operable in accordance with a predetermined voltage condition of the circuit only, means including a sequence relay connecting the voltage relay to effect operation of the switch devices in sequence, control means including a plurality of impedance devices and switch means operable in accordance with a load characteristic of the power circuit, and circuit means connecting the impedance devices in series with the relay and the switch means in shunt with the impedance devices to progressively vary the response of said relay.

3. In combination with a switch device disposed to connect a capacitor to an electrical circuit, a single relay means operable in response to an electrical characteristic of said circuit to effect operation of the switch device, a plurality of resistors, a switch for each resistor operable in accordance with a load characteristic of the circuit, but independently of the current in the circuit, and circuit means connecting the resistors in series with the relay means and the switches one in shunt with each resistor to progressively vary the response of the relay means.

4. A switching system for a capacitor having switch means operable to connect it to and disconnect it from a circuit comprising, relay means connected to effect operation of the switch means in accordance with a predetermined electrical characteristic of the circuit, and circuit means including a time switch operable to effect a change in the value of said electrical characteristic to which the relay means responds, in accordance with a predetermined operating pattern of the circuit.

5. In a switching system for a capacitor having a switch means operable to connect it to a power circuit, a control relay connected to effect operation of the switch means in accordance with an electrical characteristic of the circuit, circuit means including an impedance device connecting the control relay to the power circuit, and additional circuit means including a time switch connected to render the impedance device inoperative at predetermined interval of time.

6. The combination with a plurality of capacitors each having switch means associated therewith for connecting it to a power circuit, of means including a voltage relay connected to be responsive to the voltage of the power circuit and to effect operation of the switch means, circuit means including a plurality of impedance devices connected in circuit relation with the voltage relay to vary the voltage applied thereto from the power circuit, and switch means operable in response to a load characteristic of the circuit to render the impedance devices effective in predetermined steps.

7. The combination in a switching system for a plurality of capacitors each having switch means operable to connect it to a power circuit, of a voltage relay, means including a sequence relay connecting the voltage relay to effect operation of the switch means in a predetermined sequence in accordance with the voltage of the power circuit, circuit means including a plurality of resistors connected in series circuit relation with the voltage relay and its connection to the power circuit, and a switch having normally closed contacts connected in shunt with each of the resistors, said switches being operable to open and close said contacts in accordance with increasing and decreasing load characteristics of the power circuit.

8. In a control system for capacitor means disposed to be connected by switch means to a bus having a plurality of feeder lines associated therewith, a voltage relay operable in accordance with the bus voltage to effect operation of the switch means, said relay having electromagnetic means effective to vary the sensitivity of the relay, and circuit means connected to effect variable energization of the electromagnetic means in accordance with the number of feeder lines connected to the bus.

9. In combination with a plurality of capacitors having switch means operable to connect them to a bus provided with a plurality of switch devices operable to connect the bus to a source of electrical energy through a plurality of feeder lines, a voltage relay connected to the bus and operable in response to changes of bus voltage to effect operation of the switch means, said voltage relay having electromagnetic restraining means operable to provide a biasing force to retain the relay in an intermediate operating position, a plurality of control resistors connected in circuit relation with said electromagnetic restraining means and a source of electrical energy, and circuit means including contact means operable in response to operation of the switch devices connected to provide shunt circuits around the resistors when the switch devices are open.

References Cited in the file of this patent

UNITED STATES PATENTS

| Number | Name | Date |
|---|---|---|
| 1,940,295 | Chutter | Dec. 19, 1933 |
| 2,293,484 | Anderson | Aug. 18, 1942 |
| 2,295,388 | Cuttino | Sept. 8, 1942 |
| 2,298,026 | Bany | Oct. 6, 1942 |
| 2,404,643 | Livingston | July 23, 1946 |
| 2,451,939 | Geiselman | Oct. 19, 1948 |
| 2,506,282 | Sillers | May 2, 1950 |